(12) United States Patent
Elliot

(10) Patent No.: US 6,918,634 B2
(45) Date of Patent: Jul. 19, 2005

(54) LUMBAR SUPPORT

(75) Inventor: Andrew James Elliot, Lara (AU)

(73) Assignee: Henderson's Industries PTY LTD, Victoria (AU)

( * ) Notice: Subject to any disclaimer, the term of this patent is extended or adjusted under 35 U.S.C. 154(b) by 0 days.

(21) Appl. No.: 10/623,650

(22) Filed: Jul. 22, 2003

(65) Prior Publication Data
US 2005/0017555 A1 Jan. 27, 2005

(51) Int. Cl.$^7$ ............................................. A47C 3/025
(52) U.S. Cl. ................................................ 297/284.4
(58) Field of Search ...................... 297/284.4; 267/42

(56) References Cited

U.S. PATENT DOCUMENTS

| | | | |
|---|---|---|---|
| 5,716,098 A | | 2/1998 | Lance |
| 5,769,490 A | * | 6/1998 | Falzon ................... 297/284.4 |
| 5,954,399 A | | 9/1999 | Hong |
| 6,402,246 B1 | | 6/2002 | Mundell |
| 6,695,402 B2 | * | 2/2004 | Sloan, Jr. ............... 297/284.4 |
| 2002/0149245 A1 | | 10/2002 | Mundell |
| 2003/0071501 A1 | | 4/2003 | Cruz Fernandez De Pinho et al. |

FOREIGN PATENT DOCUMENTS

| | | | | |
|---|---|---|---|---|
| EP | 518830 A1 | * | 12/1992 | ............ A47C/7/46 |
| WO | WO 93/05683 A1 | | 4/1993 | |
| WO | WO 95/24144 A1 | | 9/1995 | |
| WO | WO 02/24033 A1 | | 3/2002 | |

* cited by examiner

Primary Examiner—Peter M. Cuomo
Assistant Examiner—Sarah C. Burnham
(74) Attorney, Agent, or Firm—Birch, Stewart, Kolasch & Birch, LLP

(57) ABSTRACT

An adjustable lumbar support, for use in the back rest of a seat, includes a flexible band which in use extends longitudinally across the back rest so that opposite ends of the band are adjacent respective opposite sides of the back rest and further includes adjusting means operable to vary the extent to which the flexible band is able to curve rearwardly relative to the seat back rest. The flexible band includes a plurality of elongate members which are spaced along, and extend transversely with respect to, the longitudinal extent of the band, and a respective resiliently compressible bridging element joining together successive elongate members. Each elongate member is sufficiently flexible whereby at least some of the elongate members are adapted to bend resiliently at opposite end portions thereof, and thereby to bend rearwardly to conform substantially to the shape of and provide resilient support for the lumbar region of an occupant of the seat, as the adjusting means is operated to reduce the extent to which the flexible band curves rearwardly.

10 Claims, 3 Drawing Sheets

LUMBAR SUPPORT

FIELD OF THE INVENTION

This invention relates to an improved lumbar support for use in the back rest of a seat, chair and the like. The invention is particularly suited for use with seats for vehicles of all kinds, including land vehicles, water borne vehicles and aircraft. For ease of description, the invention will be hereinafter described with particular reference to vehicle seats.

BACKGROUND TO THE INVENTION

It is well known to provide adjustable lumbar supports in vehicle seats, especially in the seat to be occupied by the vehicle driver. Usually lumbar supports are adjustable to assist in combating driver fatigue by the driver being able to adjust the support to suit his or her individual comfort requirements. Most supports conform to one of two principal types, namely vertically adjustable and horizontally adjustable supports.

The vertically adjustable type of lumbar support has a thin, usually rectangular form provided by a sheet of resilient material or a mesh or grid of resilient elongate members of metal or plastics material. With this type, an actuator is operable to vary the spacing between upper and lower edges of the support to adjust the extent to which the support bows or flexes forwardly about a laterally extending line.

The horizontally adjustable type of lumbar support has the form of a flexible band which extends longitudinally between opposite sides of a vehicle seat frame. An actuator is operable to adjust the depth of rearward curvature of the band, about a vertical line, against pressure applied by an occupant of the seat, such as by adjusting the effective longitudinal length of the band.

With the vertically adjustable type, the forward bowing or flexing causes lower portion of the padding and covering at the front of the seat back to be correspondingly pushed forward, as the support adopts a shape which is complementary to the lumbar region of an occupant of the seat. The arrangement is such that the seat back can have a thickness or depth which is substantially independent of the presence of the lumbar support. Thus, in line with the trend to reduce weight and maximise available space, such as in a land vehicle cabin, a designer's freedom in creating a seat back is not compromised by the need to allow for the thickness of a lumbar support of this type.

In the case of the horizontally adjustable type of lumbar support, a substantially greater thickness needs to be accommodated by the seat back rest. This is because the band has a significant effective depth due to it having a front face which has a convex form conforming somewhat to the lumbar region of standardized occupant. The lumbar support of this type therefore necessitates a thicker seat back rest and therefore limits the extent to which the seat back thickness can be reduced. Thus, it is not possible to reduce the thickness of the seat back rest to much less than the front-to-back thickness of the seat frame and, as will be appreciated, it is the seat back thickness within the frame of a front seat which determines the maximum available space for the knees of a rear seat passenger.

The greater thickness required for horizontally adjustable lumbar supports results from them conforming to the curvature of an occupant's back as a consequence of the designed shape of the flexible band. That is, the flexible band as produced has a front face which is shaped to complement that curvature. Specifically the front face is curved with respect to a horizontal centre line so as to be arcuate in end elevation, whereby as mounted on a seat frame, upper and lower edges of the flexible band are located rearwardly with respect to the centre line. This form of front face is necessary since operation of an actuator to vary the length flexible band acts to vary the curvature of the band somewhat circumferentially with respect to the waist of an occupant, rather than to conform the band to the curvature of the lumbar region.

In essence, the vertically adjustable type of lumbar support is conformable to the curvature of an occupant's lumbar region during adjustment, whereas the horizontally adjustable type has a flexible band which is pre-shaped to conform to that region.

It is an object of the present invention to provide a lumbar support of the horizontally adjustable type which is conformable during adjustment to the curvature of the lumbar region of the occupant of a seat.

SUMMARY OF THE INVENTION

Accordingly, the present invention provides an adjustable lumbar support for use in the back rest of a seat, wherein the lumbar support includes a flexible band which in use extends longitudinally across the back rest so that opposite ends of the band are adjacent respective opposite sides of the back rest and further includes adjusting means operable to vary the extent to which the flexible band is able to curve rearwardly relative to the seat back rest; wherein the flexible band includes a plurality of elongate members which are spaced along, and extend transversely with respect to, the longitudinal extent of the band, and a respective resiliently compressible bridging element joining together successive elongate members; and wherein each elongate member is sufficiently flexible whereby at least some of the elongate members are adapted to bend resiliently at opposite end portions thereof, and thereby to bend rearwardly to conform substantially to the shape of and provide resilient support for the lumbar region of an occupant of the seat, as the adjusting means is operated to reduce the extent to which the flexible band curves rearwardly.

The flexible band is longitudinally resiliently compressible, due to the bridging elements being resiliently compressible. Most preferably each bridging element comprises a resilient spring element. Each spring element, when compressed longitudinally of the band, resiliently biases apart the successive elongate members it bridges whereby the elements act to maintain or restore the length, and hence act to maintain or restore the extent of rearward curvature, of the flexible band. The adjusting means acts against the bias of the spring elements in operating to decrease the extent of rearward curvature of the band by causing the spring elements to compress and thereby decrease the effective length of the band.

Each spring element most preferably has the form of a pair of oppositely acting leaf springs and hereinafter is described as such. With that form, the leaf springs of each pair most preferably are joined together at respective ends while each spring is joined intermediate its ends to a respective one of the successive elongate members bridged by the spring element. However the converse is possible in that the leaf springs of each pair may be joined together intermediate their ends in a back to back arrangement, with each spring of the pair having both of its ends joined to a respective elongate member. In each case, the spring element preferably is integrally formed and may be assembled with elongate members to form the flexible band. However, the entire flexible band most preferably is integrally formed.

The flexible band most conveniently is made of a suitable polymeric material such as polypropylene. Preferably the band is formed by injection moulding, whether of separate components to be assembled together or as an integrally formed band.

As indicated, the flexible band of the lumbar support of the present invention is able to conform substantially to the shape of the lumbar region of an occupant of a seat in which the support is provided as the adjusting means is operated to reduce the extent to which the flexible band curves rearwardly. The flexible band conforms by the elongate elements bending resiliently at opposite end portions. The bending is in response to pressure applied to the band by the body of the occupant as the band is drawn against the occupant's lumbar region. However, the arrangement is such that in the absence of applied pressure, such as due to there not being a seat occupant, the end portions of the elongate members do not bend as the adjusting means acts to reduce the extent to which the band curves rearwardly. The band then is able to be drawn to a condition in which it has negligible rearward curvature, preferably such that the band is able exhibit a substantially planar front face, Particularly where this is the case, the flexible band is able to have an effective depth between front and rear faces which is small compared to the above-mentioned known horizontally adjustable lumbar supports. Thus, the flexible band may have a thickness of from about 3 to 6 mm. However, even with such thickness, the band can be of relatively light weight and provide efficient material usage, in being of thin wall construction. Thus, in one form, each elongate member may comprise a thin elongate plate provided with strengthening ribs, such as on a rear face of the plate. Alternatively, each elongate member may be of a skeletal, open-mesh or grid-like structure.

Where each elongate member comprises a thin plate provided with strengthening ribs, the resistance they exhibit to resilient bending at opposite end portions is, in large part, determined by the depth of the strengthening ribs. The depth of the ribs therefore is chosen such that the resistance to bending is sufficient to ensure that, in conforming to the lumbar region of an occupant of the seat, the end portions of the elongate members contribute to the occupant's awareness of support. Achieving a sufficient level of resistance to bending necessitates a suitable balance being achieved between the thickness of the plate, the number, form and disposition of the ribs and relevant characteristics of the material of which the elongate member is made. Similar considerations apply to the elongate members of a skeletal, open-mesh or grid-like structure.

Particularly where the flexible band is to have a relatively small effective depth, it is preferred that the bridging elements do not exceed the longate members in depth. Where each bridging element has the form of a pair of opposed leaf springs, each half may have a depth which is greater than its thickness in a direction longitudinally of the band. For a given material of which the bridging elements are made, the depth and thickness of each half of the bridging elements are determined by the resilient biasing force the bridging element is to be able to exert.

BRIEF DESCRIPTION OF THE DRAWINGS

The accompanying drawings illustrate a preferred embodiment of the lumbar support of the present invention. The detailed description of the drawings is to assist with an appreciation of the construction and function of the lumbar support. In the drawings.

DETAILED DESCRIPTION OF THE PREFERRED EMBODIMENTS

Figure 1:
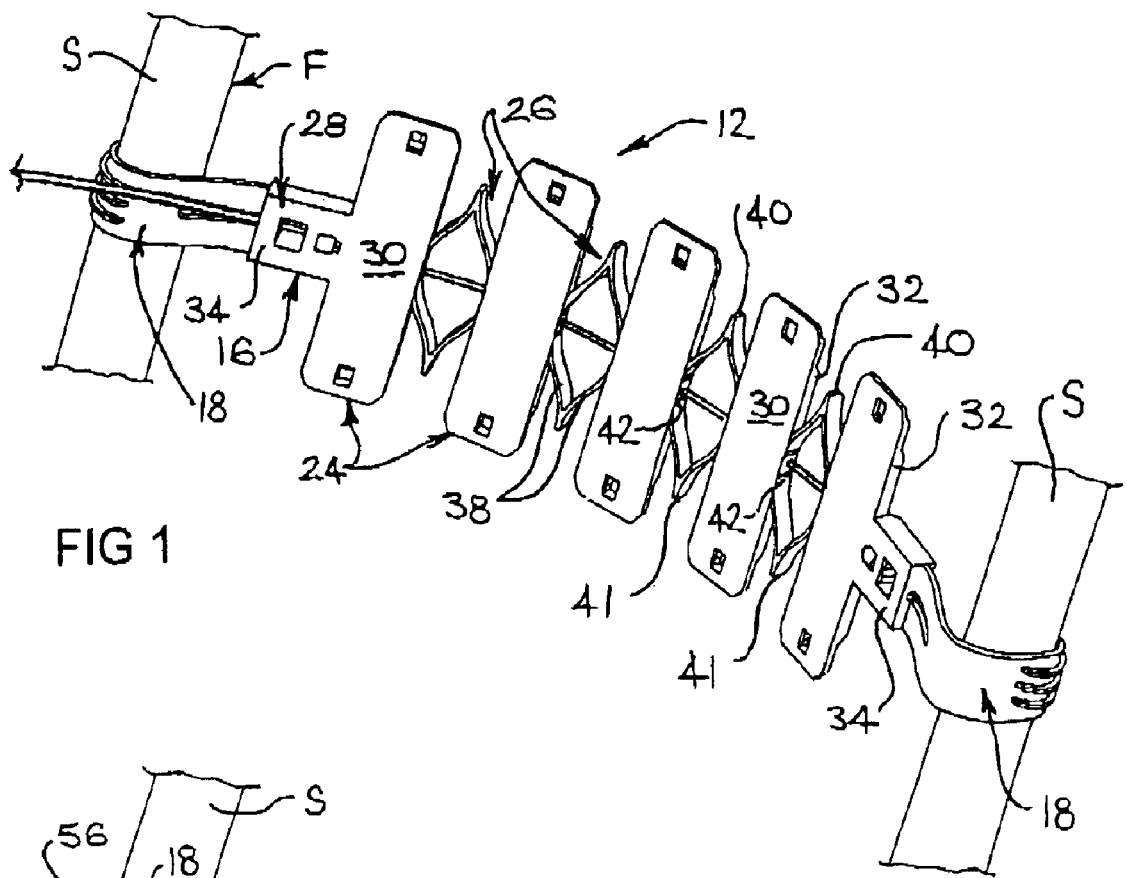
FIG. 1 is a perspective view from the front of a lumbar support according to an embodiment of the invention, shown in a first condition.
Figure 2:
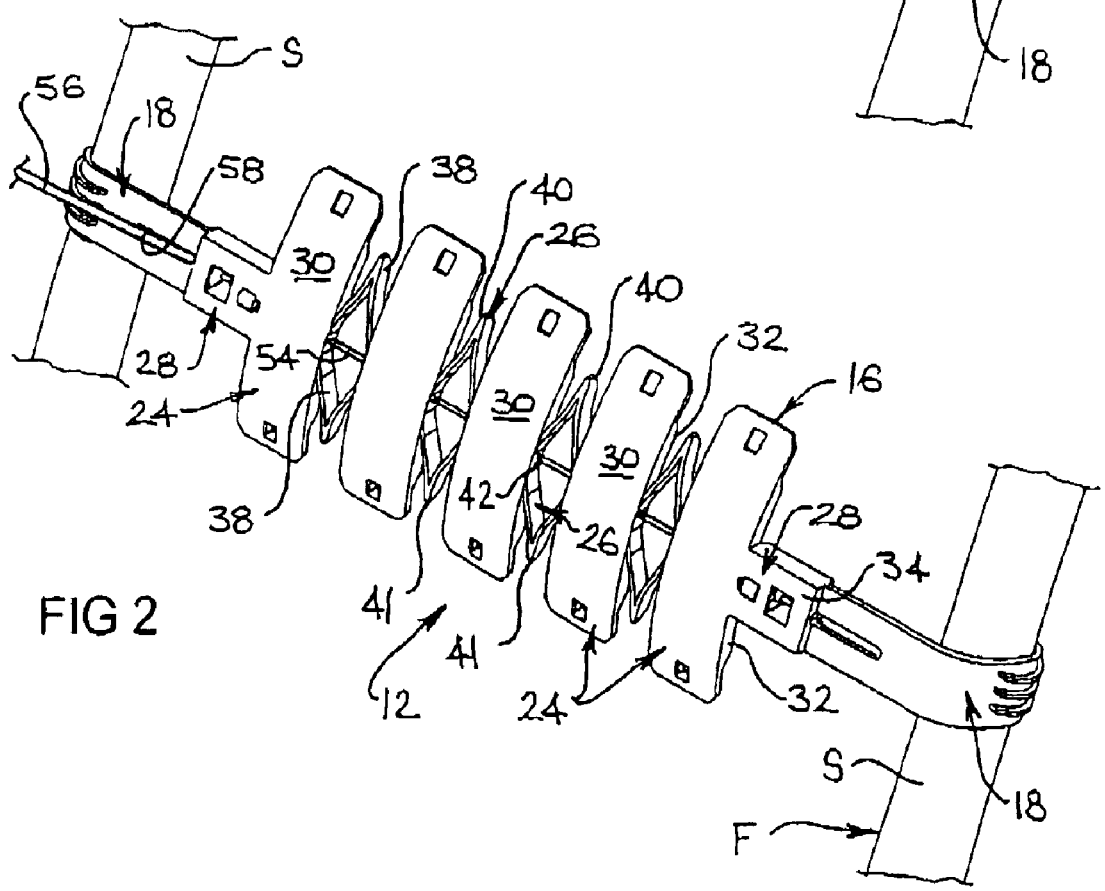
FIG. 2 corresponds to FIG. 1 but shows the lumbar support in a second condition.
Figure 3:
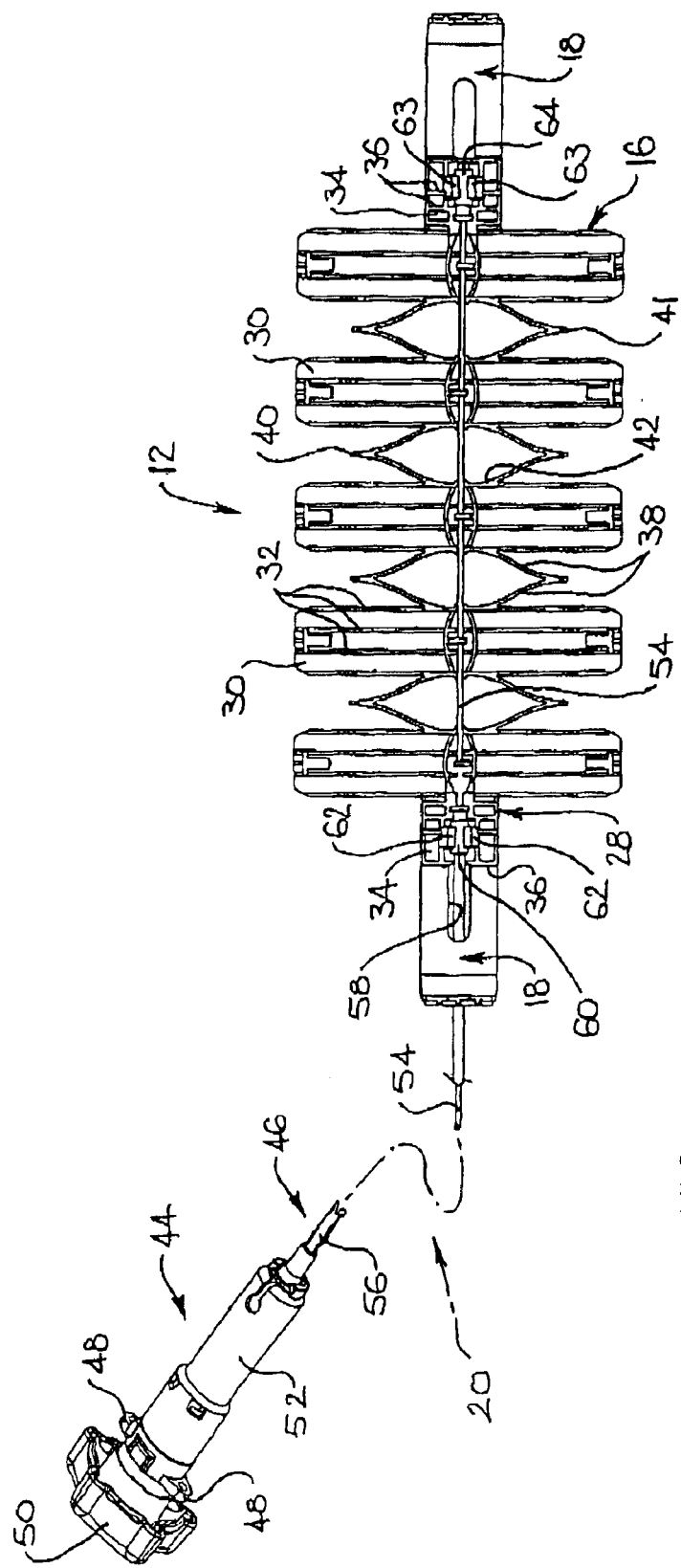
FIG. 3 is a rear elevational view of the lumbar support of the embodiment of FIG. 1 shown in an extended, unmounted condition.

With reference to FIGS. 1 to 3, there is shown a part of a seat back frame F for a vehicle. The frame F has laterally spaced, upwardly extending side sections S jointed together at the top of frame F by a cross-bar (not shown). Mounted between sections S of frame F, there is a lumbar support 12 according to an embodiment of the present invention. The lumbar support 12 includes an elongate flexible band 16 having a respective connecting tongue or section 18 at each end by which it is coupled to a respective side section S of frame F. The support 12 further includes an actuator system 20 shown in FIG. 3.

The flexible band 16 is integrally formed by injection moulding from a suitable polymeric material such as polypropylene. Band 16 comprises a plurality of elongate members 24 and bridging elements 26. The members 24 extend laterally with respect to the longitudinal extent of, and an uniform intervals along, band 16. A respective element 26 interconnects successive members 24, while a respective connector portion 28 interconnects the member 24 nearest each end of band 16 to the adjacent end tongue 18.

Band 16, as produced, is such that the front face of each member 24 and each element 26 is able to be substantially in a common plane as depicted in FIG. 3. Each member 24 has a front face defined by a thin plate 30 such as of 0.7 to 1.2 mm thick. However, as seen in FIG. 3, each member 24 is stiffened at the rear of plate 30 by a plurality of ribs or fins 32 which extend along a major part of the length of its plate 30. The ribs 32 have a width dimension perpendicularly of the plate 30 which is greater than the plate thickness, such that the members 24 may have a thickness of about 3 to 6 mm. Also, each connector portion 28 has a front face defined by a similarly thin plate 34 which is braced by short transverse ribs 36, while end tongues 18 have the form of a strap of similar thickness to the plate 34.

Each bridging element 26 is compressible longitudinally of band 16 as a result of element 26 comprising a spring element having a pair of spring members 38. As a consequence of elements 26 being compressible, the length of flexible band 16 is able to be varied between the length shown in FIGS. 1 and 3 and the reduced length shown in FIG. 2. The length of band 16 is able to be varied in response to variation in the extent to which band 16 curves rearwardly of frame F, between sections S, from a maximum condition of rearward curvature such as shown in FIG. 1 to a condition of zero or negligible curvature such as shown in FIG. 2.

In the arrangement of FIGS. 1 to 3, the spring members 38 of each pair have the form of opposed leaf springs. At their upper and lower ends, the members 38 are joined together at 40 and 41, respectively. Intermediate their ends, each member 38 of a pair thereof is joined at 42 to a respective one of the successive elongate members 24 between which the respective bridging element 26 is provided.

In the arrangement shown, each spring member 38 has a width in the front to rear direction of band 26 which corresponds substantially to the thickness of elongate members 24, such as from 3 to 6 mm. Each member 38 has a thickness in the longitudinal direction of band 16 which is less than its depth, such as of about 0.7 to 1.2 mm. However, other relative depth and thickness dimensions are possible, with these being chosen for a given material of which band 16 is made to achieve a required level of resilient compressibility for elements 26.

Alternative arrangements are possible for elements 26. Thus, for example, rather than springs 38 being opposed and joined together at their ends, they may be in back to back relationship relative to that shown. That is, each spring 38 of a pair may be in the position located by the other, with each of its ends joined to a respective member 24 and the members 38 of the pair joined to each other in a back to back relationship, at a location intermediate the ends of each of them.

Still further alternatives are detailed later herein.

The actuator system 20 of lumbar support 12 has an actuator device 44 and a Bowden cable system 46. The actuator device 44 is operable to adjust the flexible band 16 between the respective conditions shown in FIGS. 1 and 2. For this, device 44 is mounted in a fixed location by lugs 48 and, by rotating a handle 50 relative to housing 52, device 44 moves a cable 54 of system 46 longitudinally within a sleeve 56 of system 46. The direction of movement of cable 54 in sleeve 56 is determined by the direction of rotation of handle 50.

The device 44 can take a variety of forms. A preferred example is disclosed in our co-pending U.S. patent application Ser. No. 10/618,821 by Macaulay and Harris, entitled "Cable Actuator for Lumbar Support", filed Jul. 15, 2003, the disclosure of which is incorporated herein. Further examples are disclosed in U.S. Pat. No. 5,638,722 to Klingler; U.S. Pat. No. 6,053,064 to Gowing et al; and U.S. Pat. No. 6,520,580 to Hong, the disclosure of each of which also is incorporated herein by reference.

As shown in FIG. 3, the cable 54 of Bowden system 46 extends beyond the end of sleeve 56 remote from actuator device 44. The cable 54 and sleeve 56 extend through a slot 58 in a first end section 18 of band 16. The sleeve ends at a cylindrical termination 60 which is secured by a snap fit between fingers 62 defined at the back of the connector portion 28 adjacent to the first end section 18. The cable 54 extends through the termination 60 and along a longitudinal centre region of band 16. A termination 64 secured on the free end of cable 54 is secured by a snap fit between fingers 63 defined at the back of the connector portion 28 which is remote from the portion 28 at which termination 60 is held.

Considering the lumbar support as seen in FIG. 3, the arrangement is such that, by rotating handle 50 in a direction causing cable 54 to be retracted into sleeve 56, the effective length of flexible band 16 is reduced. This reduction results from tension in cable 54 compressing the bridging elements 26, to cause resilient flexing of spring members 38 and a reduction in the spacing between successive elongate members 24. If handle 50 then is rotated in the reverse direction, to cause cable 54 to extend further from sleeve 56, band 16 is able to recover to the condition shown in FIG. 3 by members 38 recovering substantially to their unstressed condition.

The length of band 16 is such that, when mounted on frame F with members 38 substantially unstressed, band 16 is able to curve rearwardly of frame F as shown in FIG. 1. That is, the length of the section of band 16 between side sections S of frame F is greater than the spacing between section S. The arrangement is such that, as handle 50 of actuator device 44 is rotated to retract cable 54 into sleeve 56, to thereby compress elements 26, the extent of rearward curvature of band 16 is able to be progressively reduced until it is is negligible or substantially zero, as shown in FIG. 2. In this regard, it is to be appreciated that the reference to rearward curvature is in relation to the longitudinal extent of band 16, as distinct from curvature of elongate members 24 as described in the following.

As shown in FIG. 1, each elongate member 24 is in a condition in which the front face of its plate 30 is substantially planar. However, due to the rearward curvature of band 16 as shown in FIG. 1, the front face of each plate 30 is in a respective plane, rather than in a common plane as in the condition shown in FIG. 3. Whether the front face of each plate 30 remains planar as the rearward curvature of band 16 is reduced to zero depends on whether or not there is an occupant in the seat in which support 12 is provided. Where there is no seat occupant, each plate is able to be brought into a position similar to that shown in FIG. 2, but with the front face of each plate 30 substantially co-planar. Where there is an occupant in the seat, reduction in the rearward curvature becomes progressively more strongly resisted by the occupant's body. As a consequence, the upper and lower end portions of at least some members 24 are resiliently bent rearwardly, as depicted in FIG. 2, by reaction forces generated by the occupant's body acting to cause the end portions to bend to conform to the shape of the lumbar region of the occupant. Thus, the front face of at least some members 24 cease to be planar and adopt convex forms as shown in FIG. 2.

The bending of the end portions of members 24, of course, necessitates band 16 being at an appropriate height on sections S of the seat back frame F, at which the mid-region of the members 24 is aligned with the hollow of the occupant's back at the lumbar region. Also, bending of the end portions of members 24 is assisted by cable 54 extending across a mid-region of each member 24 such that both opposite end portions of each member 24 are free to resiliently bend rearwardly. Also, as the end portions bend resiliently, they are able to recover so that members 24 resume the shape shown in FIG. 1, as actuator device 44 is operated to increase the extent of rearward curvature of band 16. This recovery results from the band 16 moving away from the occupant's lumbar region and ceasing to be forced to conform to the shape of that region.

As best seen in FIGS. 1 and 2, the ribs 32 of elongate members 24 and the members 38 of elements 26 are notched to accommodate and centrally locate is cable 54. The cable 54 is thereby effectively able to be retained in position by the combined action of tension in cable 54 and the resilience of bridging elements 26.

Figure 5:
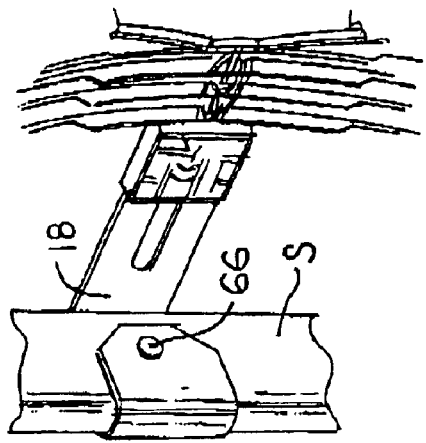
FIGS. 4 to 7 each shows a respective termination for a lumbar support according to the invention.
Figure 4:
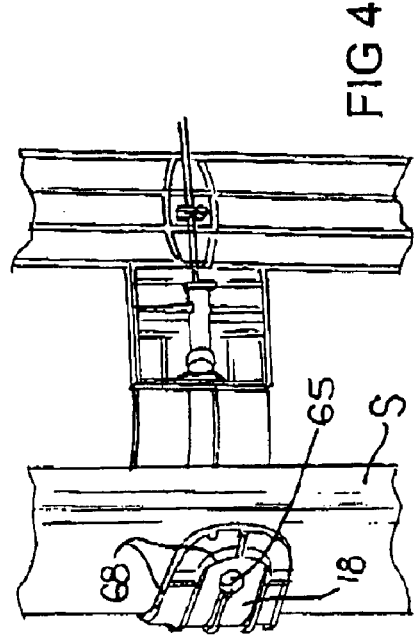

The form of connection to each side section S is shown in FIG. 4 for the end of band 16 remote from actuator device 34. As indicated by this, the end tongue 18 extends around to the outer side face of the respective side section S of frame F. The tongue 18 is secured by a screw, rivet or other suitable fastener (not shown) applied through hole 65 of tongue 18 into frame section S. An alternative is shown in FIG. 5, in which the tongue 18 of band 16 extends around a major part of the circumference of frame section S. As shown in FIG. 5, the tongue 18 is secured by a screw 66, rivet or other suitable fastener, extending through tongue 18 into the inner side face of section S. As shown in FIG. 4, the respective tongues 18 may be strengthened around the holes 18a by bead or rib formations 68.

Figure 6:
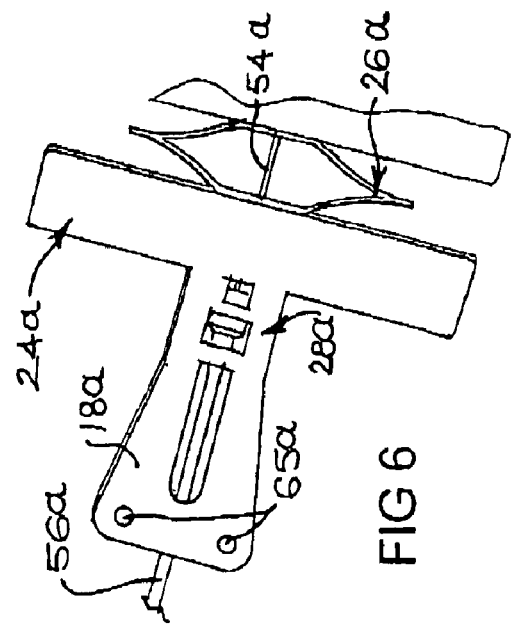

A further variant is shown in FIG. 6. This differs principally in that tongue 18a increases in width to its free end and accommodates a laterally spaced pair of attachment holes 65a. The tongue 18a may wrap around a frame section S to the outer side face, as in FIG. 4, or the tongue 18a of FIG. 6 may be secured by screws or other fasteners to the front or rear face of a section S (not shown).

Figure 7:
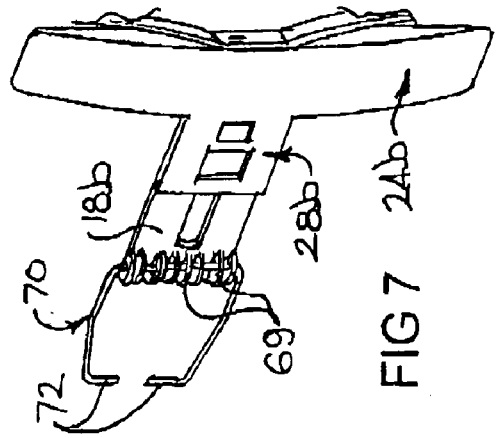

An alternative approach is shown in FIG. 7. In this, tongue 18b has a number of raised tabs 69 spaced across the lateral extent of its free end. The tabs define holes which are aligned with each other and through which a stiff wire connector 70 extends. The connector 70 has a part rectangular form to define two opposed legs 72 which are able to hook into tabs or holes found in a frame section S (not shown).

In FIGS. 5 and 7, the respective elongate member 24, 24b nearest to the end of flexible band 16, 16b shown is in the condition illustrated in FIG. 2. That is, the opposite end portions of the respective member 24, 24b are shown bent rearwardly, as in conforming to a seat occupant's lumbar region. FIG. 5 is from the rear and hence shows the concave rear face rather than the convex front face evident in FIG. 7.

In addition to the form of elements 26 as described with reference to FIGS. 1 to 3, and the alternative detailed above of an arrangement having members 38 in a back to back relationship, still further alternatives are possible. Thus, in relation to elements 26 as shown in FIGS. 1 to 3, one further alternative would be similar, but comprising a pair of spring elements of a V-shape which point away from each other. In this case, each spring element would have a respective end connected to each elongate member, with a short spacing between the ends of each of the elements such that they are connected only through the elongate members. This readily can be appreciated from FIGS. 1 to 3 by considering the notches in which cable 54 is accommodated as extending across the side of each member 24 to the front face. A still further alternative can be appreciated from the back to back arrangement for members 38, the still further alternative comprising a pair of spring elements of a V-shape which point towards each other, with their apices close to each other but not connected together. Again, the elements would be connected only through the elongate members.

Finally, it is to be understood that various alterations, modifications and/or additions may be introduced into the constructions and arrangements of parts previously described without departing from the spirit or ambit of the invention.

What is claimed is:

1. An adjustable lumbar support for use in the back rest of a seat, wherein the lumbar support includes a flexible band which in use extends longitudinally across the back rest so that opposite ends of the band are adjacent respective opposite sides of the back rest and further includes adjusting means operable to vary the extent to which the flexible band is able to curve rearwardly relative to the seat back rest; wherein the flexible band includes a plurality of elongated members which are spaced along,, and extend transversely with respect to, the longitudinal extent of the band, and a respective resiliently compressible bridging element joining together successive elongated members; wherein each elongated member is sufficiently flexible whereby at least some of the elongated members are adapted to bend resiliently at opposite end portions thereof, and thereby to bend rearwardly to conform substantially to the shape of and provide resilient support for the lumbar region of an occupant of the seat, as the adjusting means is operated to reduce the extent to which the flexible band curves rearwardly; and wherein each bridging element comprises a resilient spring element which has a form of oppositely acting leaf springs with the leaf springs of each pair being joined together at respective ends and each is joined intermediate its ends to a respective one of the respective elongate members joined by the spring element.

2. The lumbar support of claim 1, wherein each bridging element comprises a resilient spring element, and the bridging elements act to maintain or restore flexible band at a length which maintains or restores the extent of rearward curvature.

3. The lumbar support of claim 1, wherein the flexible band is formed integrally.

4. The lumbar support of claim 1, wherein the elongate members are adapted to bend rearwardly, as the adjusting means is operated to reduce the extent to which the flexible band curves rearwardly, in response to pressure applied to the band by the body of an occupant of a seat in which the support is provide.

5. The lumbar support of claim 1, wherein the flexible band has a thickness of from about 3 to 6 mm.

6. The lumbar support of claim 1, wherein each elongate member is adapted to bend rearwardly at opposite end portions thereof from a condition in which the front face of the elongate member is substantially planar.

7. The lumbar support of claim 1, wherein each elongate member comprises a thin plate provided with strengthening ribs.

8. The lumbar support of claim 1, wherein each elongate member comprises a thin plate of from 0.7 to 1.2 mm thick and which defines a front face of the elongate member, and a plurality of stiffening ribs or fins which extend over a face of the member.

9. The lumbar support of claim 8, wherein the ribs or fins extend over a major part of the length of the plate.

10. The lumbar support of claim 1, wherein the adjusting means comprises a Bowden cable system and an actuator device; and wherein the cable system includes a sleeve which extends between the actuator device and one end of the flexible band and a cable which extends from the actuator device, through the sleeve and, form the one end of the flexible band, along the band to the other end thereof, and the actuator device is operable to move the cable longitudinally within the sleeve for varying the extent of rearward curvature of the flexible band.

* * * * *